United States Patent
Georgoulias et al.

(10) Patent No.: US 12,453,308 B2
(45) Date of Patent: Oct. 28, 2025

(54) MOWER CUTTING UNIT LIFT SYSTEM WITH FLEXIBLE LINK

(71) Applicant: DEERE & COMPANY, Moline, IL (US)

(72) Inventors: Chris M. Georgoulias, Apex, NC (US); Brent G. Rinholm, Fuquay Varina, NC (US); Bryce A. Carnahan, Chapel Hill, NC (US)

(73) Assignee: DEERE & COMPANY, Moline, IL (US)

( * ) Notice: Subject to any disclaimer, the term of this patent is extended or adjusted under 35 U.S.C. 154(b) by 1004 days.

(21) Appl. No.: 17/449,460

(22) Filed: Sep. 30, 2021

(65) Prior Publication Data
US 2023/0095360 A1   Mar. 30, 2023

(51) Int. Cl.
| | |
|---|---|
| *A01D 34/43* | (2006.01) |
| *A01D 34/62* | (2006.01) |
| *A01D 34/74* | (2006.01) |
| *A01D 75/18* | (2006.01) |
| A01D 34/64 | (2006.01) |

(52) U.S. Cl.
CPC ............. *A01D 34/43* (2013.01); *A01D 34/62* (2013.01); *A01D 34/74* (2013.01); *A01D 75/182* (2013.01); *A01D 2034/645* (2013.01)

(58) Field of Classification Search
CPC ........ A01D 34/43; A01D 34/62; A01D 34/74; A01D 2034/645; A01D 75/182
See application file for complete search history.

(56) References Cited

U.S. PATENT DOCUMENTS

| | | | |
|---|---|---|---|
| 5,343,680 A | 9/1994 | Reichen et al. | |
| 5,946,893 A * | 9/1999 | Gordon | A01D 34/74 56/15.8 |
| 7,448,193 B2 | 11/2008 | Derby | |
| 7,631,478 B2 † | 12/2009 | Henson | |
| 8,544,251 B2 | 10/2013 | Goman et al. | |
| 2004/0144075 A1 * | 7/2004 | Jackson | A01D 34/13 56/257 |
| 2007/0144129 A1 * | 6/2007 | Daly | A01D 34/56 56/11.9 |
| 2008/0060331 A1 | 3/2008 | Phillips | |

(Continued)

FOREIGN PATENT DOCUMENTS

| | | | |
|---|---|---|---|
| EP | 1852008 A1 * | 11/2007 | ............. A01D 34/62 |
| EP | 3440915 A2 | 2/2019 | |

(Continued)

OTHER PUBLICATIONS

ISL Products International Ltd., Servo Motor Fundamentals, Jun. 15, 2021 (Year: 2021).*

(Continued)

*Primary Examiner* — Joseph M Rocca
*Assistant Examiner* — Ashley A Kaercher

(57) ABSTRACT

A mower cutting unit lift system includes a rotary motor connected to a power supply and turning an output shaft connected to a bell crank. A flexible link between the bell crank and a lift arm is used to lift a cutting unit to a transport position if the rotary motor turns the output shaft and the bell crank in a first direction, and lower the cutting unit to a mowing position if the rotary motor turns the output shaft and the bell crank in a second direction.

23 Claims, 5 Drawing Sheets

(56) References Cited

U.S. PATENT DOCUMENTS

2018/0160619 A1\* 6/2018 Manji ................. A01D 34/008
2019/0045712 A1\* 2/2019 Georgoulias ........... A01D 34/62

FOREIGN PATENT DOCUMENTS

EP         3446557 A2 \*  2/2019  ............. A01D 34/44
GB         1068738 A      5/1967

OTHER PUBLICATIONS

Great Britain Search Report issued in application No. GB2212466.3 dated Feb. 10, 2023 (02 pages).
Screen captures from YouTube video clip entitled Konecranes CLX—Our Best Chain Hoist Yet, 1 page, uploaded on Mar. 15, 2013, by user Konecranes. Retrieved from Internet: https://www.youtube.com/watch?v=qEvV5tW_IIA.†
Screen captures from YouTube video clip entitled How to Adjust the Pitch, Level, and Deck Height on Your Scag Lawn Mower, 1 page, uploaded on Jul. 24, 2020, by user KPM Exceptional. Retrieved from Internet: https://www.youtube.com/watch?v=tFleXPvpzZs.†
Dutton-Lainson, TW4000 Electric Winch, Sep. 21, 2010, Dutton-Lainson Company, website, https://web.archive.org/web/20100921042623/https://www.dutton-lainson.com/proddetail.php?prod=25200.†
Screen captures from YouTube video clip entitled Wright Stander Intensity: Mower Overview, 2 pages, uploaded on Jul. 2, 2015, by user Wright Commercial Mowers. Retrieved from Internet: https://www.youtube.com/watch?v=vWkoUJekEJY.†

\* cited by examiner
† cited by third party

MOWER CUTTING UNIT LIFT SYSTEM WITH FLEXIBLE LINK

FIELD OF THE INVENTION

The present invention relates to grass mowing machines, and more specifically to lift systems for cutting units on golf course mowers.

BACKGROUND OF THE INVENTION

Grass mowing machines for golf courses, parks, and athletic fields where a high quality of cut is desired, may include three or more cutting units. For example, triplex greensmowers have two forward reel cutting units followed by a center or rear reel cutting unit positioned under the vehicle frame and the operator station. Each cutting unit may be mounted to a lift arm that may be used to lift and lower the cutting unit between a mowing position and a transport position.

Lift systems for mower cutting units include hydraulic cylinders or linear actuators connected to the lift arms. However, hydraulic cylinders and linear actuators have several disadvantages. There is limited space for a full range of motion, they increase the weight in front of the front wheels and tires, and they require hydraulic pressure or electric power to hold the cutting units up in the transport position.

A mower cutting unit lift system is needed having remotely mounted power units at locations where there is space available for a full range of motion, that shifts the weight behind the front wheels and tires, and does not require hydraulic pressure or electric power to hold the mower cutting units up in the transport position.

SUMMARY OF THE INVENTION

A mower cutting unit lift system includes a flexible link connecting each rotary motor to a lift arm holding a cutting unit. Each rotary motor retracts the flexible link to lift the cutting unit to a transport position, and extends the flexible link to lower the cutting unit to a mowing position.

DESCRIPTION OF PREFERRED EMBODIMENT

Figure 1:
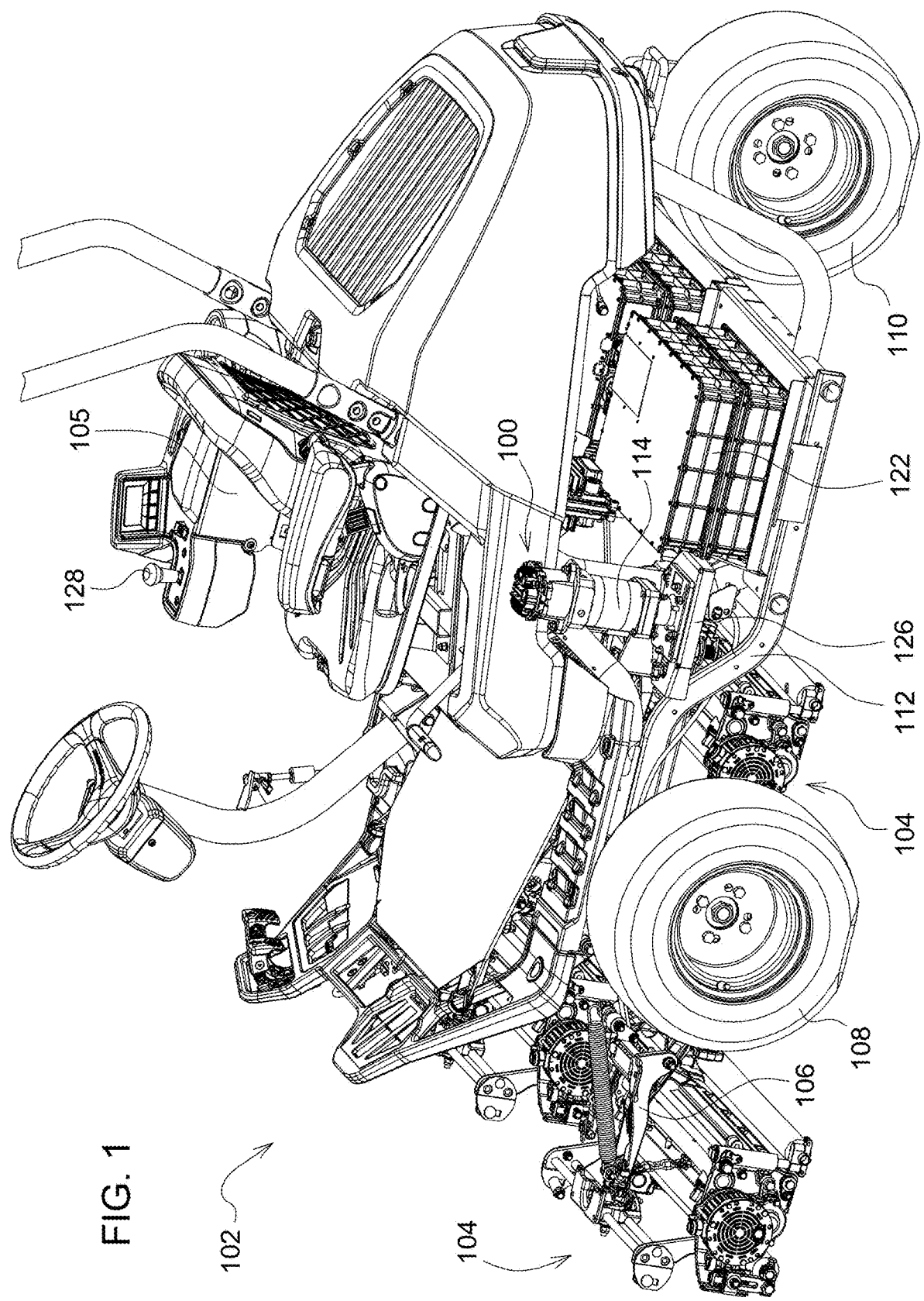
FIG. 1 is a top view of a triplex greensmower with a mower cutting unit lift system according to a first embodiment.

In a first embodiment shown in FIGS. 1-5, mower cutting unit lift system 100 is shown on triplex greensmower 102 for each of three reel cutting units 104. The mower cutting unit lift system also may be used for each of five or more cutting units on fairway mowers or rough mowers. Each mower cutting unit lift system may be connected to one or more lift arms 106, 107 that pivot up to lift the cutting unit from a mowing position to a transport position, and pivot back down to lower the cutting unit from the transport position to the mowing position. For example, lift arm 106 may be pivotably mounted to lift arm 107, which may pivot on axis 144 relative to vehicle frame 112. The vehicle frame may be supported by a pair of front wheels and tires 108 and a steerable rear wheel and tire 110.

In one embodiment shown in FIGS. 1-5, each mower cutting unit lift system 100 may include rotary motor 114. In the preferred embodiment, each rotary motor may be electrically powered by battery 122 or another electric power source. Each rotary motor may include a gearbox which may increase torque from the rotary motor to output shaft 124. Each rotary motor may have a vertical or horizontal orientation and may be mounted to bearing housing 130. The output shaft from the rotary motor may extend through the bearing housing and may be connected to bell crank 118, or other winding mechanism such as a spool. The rotary motor and bearing housing assembly may be mounted to plate 126 which may be welded or attached to vehicle frame 112, preferably at a location remote from the cutting unit and lift arm. The rotary motor and bearing housing assembly may be mounted to plate 126 where there is space available for a full range of motion. For example, the assembly may be mounted rearwardly of the front wheels and tires of the vehicle. An electric rotary motor is preferred for the mower cutting unit lift system, but a non-electric rotary motor also may be use and is encompassed by the present invention.

In one embodiment shown in FIGS. 1-5, each mower cutting unit lift system 100 may include flexible link 116 connecting between bell crank 118 of rotary motor 114 and lift arm 106 of cutting unit 104. The flexible link changes the rotary motion of the rotary motor into a linear motion of the lift arm. Between the bell crank and lift arm, the flexible link may pass through guide 134 and one or more rollers 136 which may bend or change the direction of the flexible link. The flexible link also has sufficient tensile strength to support a cutting unit weighing 150 lbs or more, and may include a material such as rubber that allows the flexible link to twist when routed through guide 134 and rollers 136. Alternatively, the flexible link my include other materials such as fabric, chain or metal links, for example. The flexible link even may be doubled over or may act as a shock absorber to cushion the load of the cutting unit and reduce stress on the components.

Figure 2:
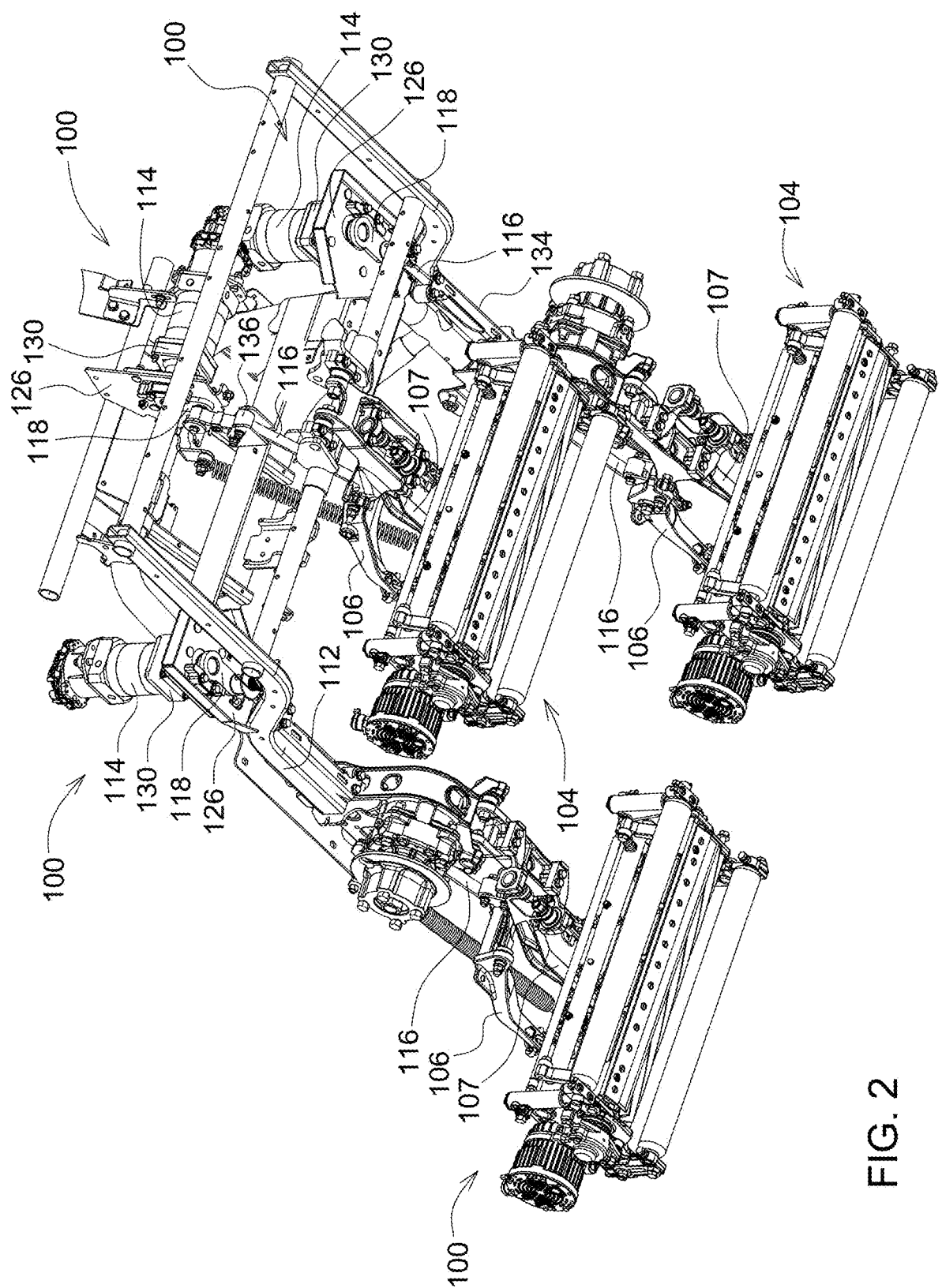
FIG. 2 is a bottom perspective view of a triplex greensmower with a mower cutting unit lift system in a transport position according to a first embodiment.
Figure 3:
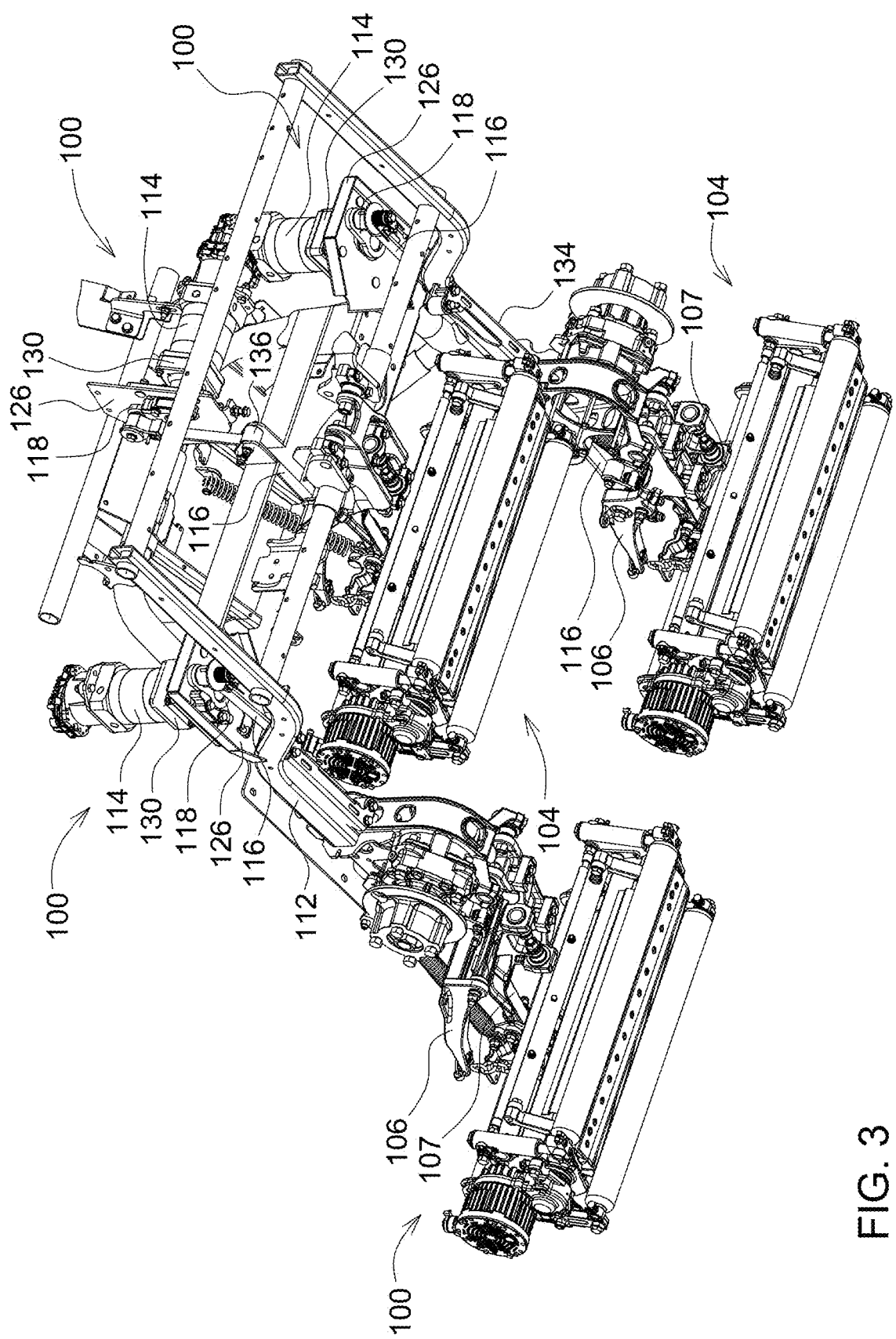
FIG. 3 is a bottom perspective view of a triplex greensmower with a mower cutting unit lift system in a mowing position according to a first embodiment.
Figure 4:
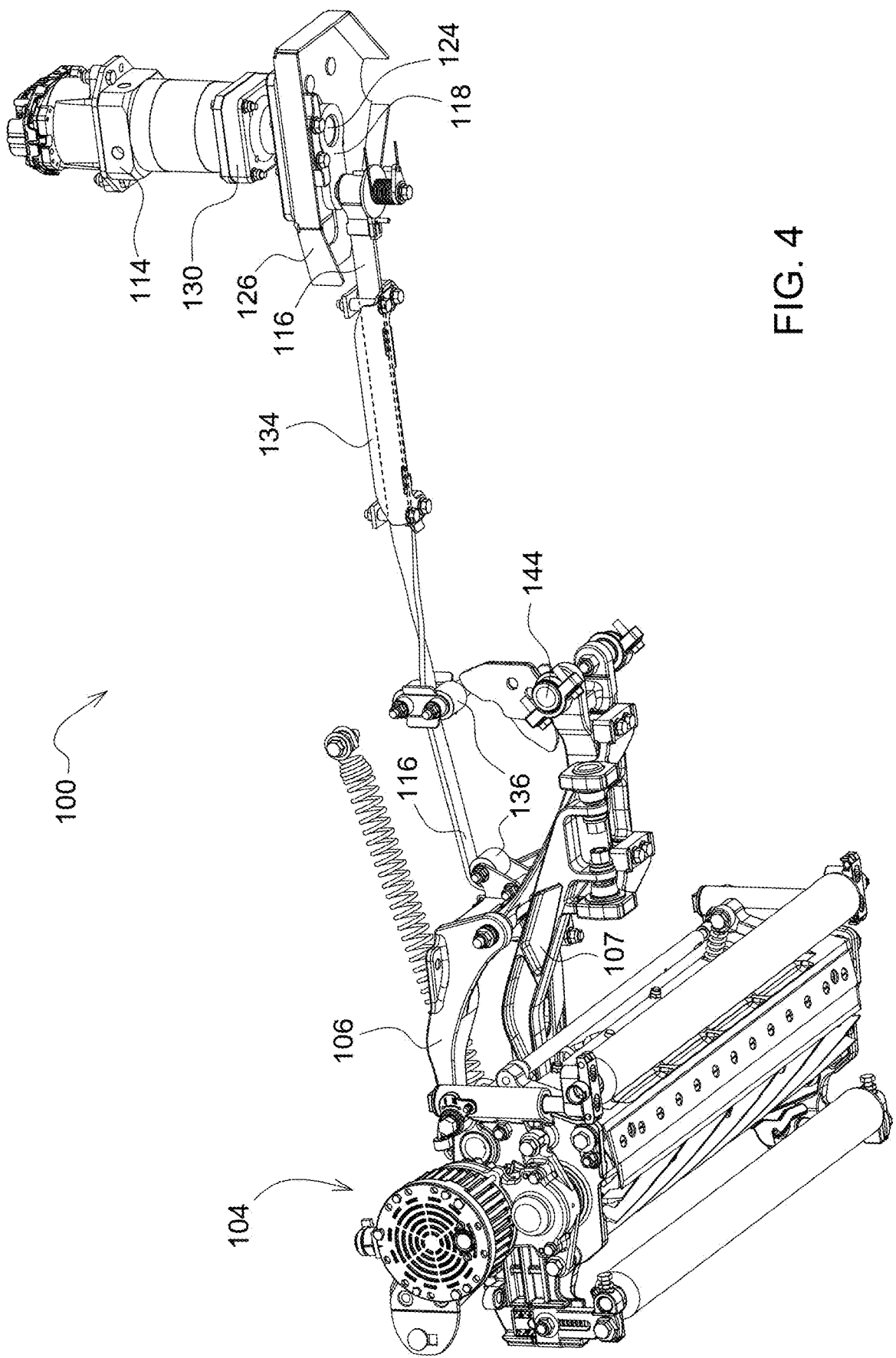
FIG. 4 is a bottom perspective view of a mower cutting unit lift system in a transport position according to a first embodiment.
Figure 5:
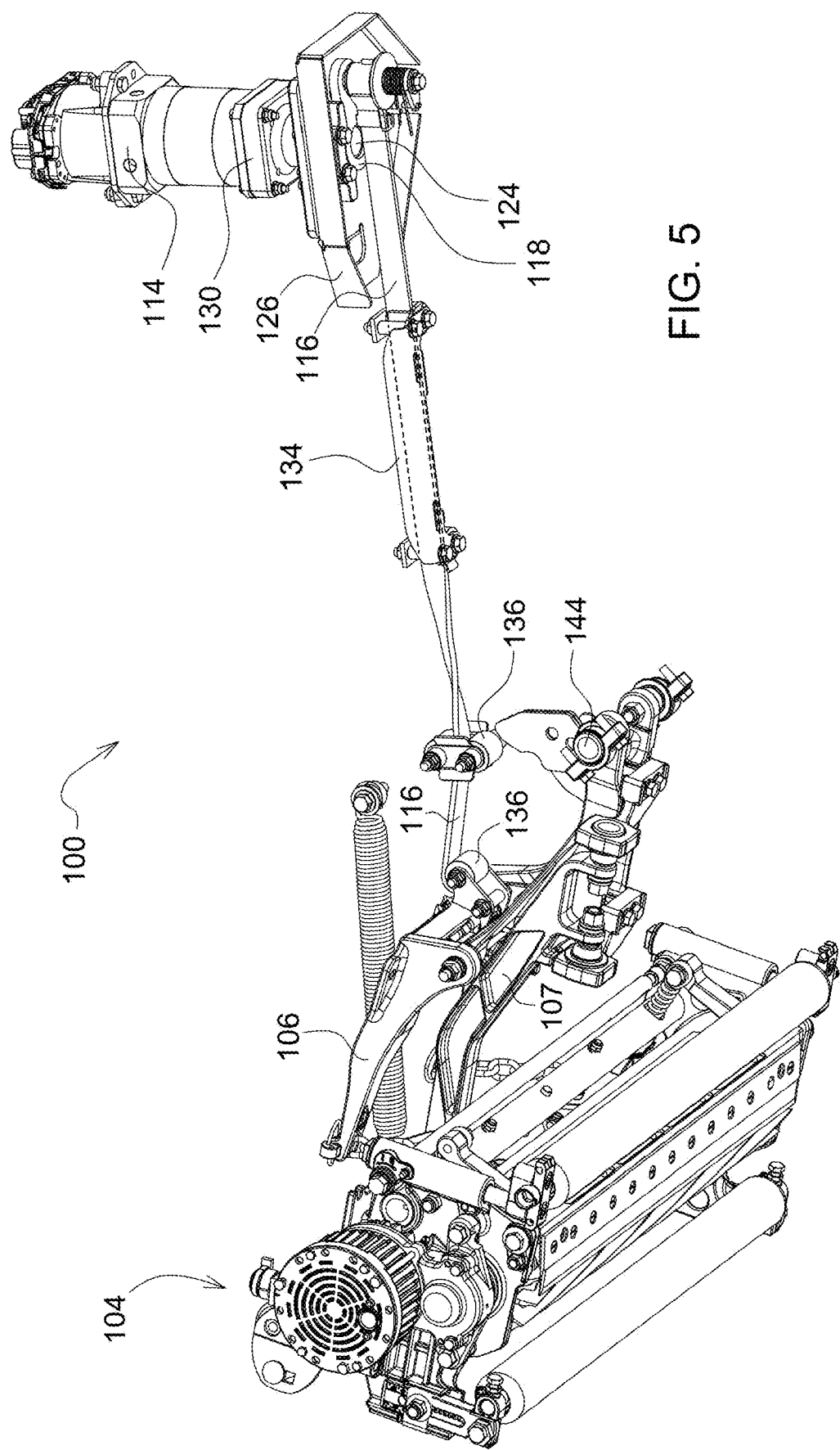
FIG. 5 is a bottom perspective view of a mower cutting unit lift system in a mowing position according to a first embodiment.

In one embodiment shown in FIGS. 1-5, mower cutting unit lift system 100 may include joystick or lever 128 which the operator may use to lift or lower the cutting units. The joystick or lever may provide signals to one or more electronic controllers 105 to actuate rotary motors 114. For example, when the operator moves the joystick or lever, the controller or controllers may actuate the rotary motors sequentially based on a timing interval between the front and rear cutting units. As shown in FIGS. 2 and 4, each rotary motor may turn output shaft 124 to turn bell crank 118 more than 180 degrees. When the rotary motor turns the output shaft and bell crank in a first direction, the bell crank retracts the flexible link, and pivots the lift arm(s) and cutting unit up to the transport position. When the rotary motor turns the output shaft and bell crank in the opposite or second direction, the bell crank extends the flexible link, and pivot the lift arm(s) and cutting unit down to the mowing position.

In one embodiment shown in FIGS. 2 and 4, each of the lift arm(s) and cutting units may be held in the transport position without requiring power to the rotary motor. The rotary motor may turn the output shaft and bell crank over center where the bell crank reaches a stop at the transport position. After reaching the stop, the weight of the cutting unit may continue to hold it in the transport position without requiring the rotary motor to be powered. In the transport position, the flexible link also may allow the lift arm(s) and cutting unit to move above the transport height for trailer loading or extreme contour following. Likewise, in the mowing position, the flexible link may allow the cutting unit to freely follow ground contours while mowing.

In one embodiment, the mower cutting unit lift system also may determine the fullness of a grass catcher attached to the front of cutting unit 104 when the cutting unit is lifted or lowered. The mower cutting unit lift system may use force or torque data from each rotary motor 114 which may be provided to controller 105. To determine the fullness, the controller may calibrate and record the force or torque of each rotary motor to raise a cutting unit with an empty grass catcher, and compare it to the force or torque to raise the cutting unit with a grass catcher loaded with clippings. Based on the calibration, the controller may provide a visible or audible alert or warning to the operator when the grass catcher reaches a specified weight of grass clippings while it is lifted or lowered.

Having described the preferred embodiment, it will become apparent that various modifications can be made without departing from the scope of the invention as defined in the accompanying claims.

What is claimed is:

1. A mower cutting unit lift system, comprising:
   a rotary motor connected to a power supply and turning an output shaft; and
   a flexible link between the rotary motor and a lift arm that lifts a cutting unit to a transport position if the rotary motor turns the output shaft in a first direction, and lowers the cutting unit to a mowing position if the rotary motor turns the output shaft in a second direction;
   wherein the flexible link bends as the cutting unit moves between the transport position and the mowing position; and
   wherein the cutting unit is pivotable between the transport position and the mowing position.

2. The mower cutting unit lift system of claim 1 wherein the lift arm and cutting unit remain in the transport position without power.

3. The mower cutting unit lift system of claim 1 wherein the power supply is a battery and the rotary motor is electric.

4. The mower cutting unit lift system of claim 1 wherein the flexible link bends as it contacts at least one roller between the rotary motor and the lift arm.

5. The mower cutting unit lift system of claim 1 further comprising measuring the torque of the rotary motor to determine the fullness of a grass catcher attached to the cutting unit.

6. The mower cutting unit lift system of claim 1, wherein the cutting unit includes a reel.

7. The mower cutting unit lift system of claim 1, wherein the flexible link is held in tension during lifting and lowering.

8. A mower cutting unit lift system, comprising:
   a flexible link connecting between an electric motor and a lift arm holding a cutting unit, wherein a first end of the flexible link is connected to a crank on a shaft that is turned by the electric motor;
   the electric motor retracting the flexible link to lift the cutting unit to a transport position, and extending the flexible link to lower the cutting unit to a mowing position;
   wherein the flexible link bends during extension and retraction thereof.

9. The mower cutting unit lift system of claim 8 further comprising at least one roller directing a path of the flexible link between the electric motor and the lift arm.

10. The mower cutting unit lift system of claim 8 wherein the cutting unit remains in the transport position without power when the electric motor is off.

11. The mower cutting unit lift system of claim 8 wherein the electric motor is positioned rearwardly of a pair of front wheels of a vehicle.

12. The mower cutting unit lift system of claim 8 further comprising sensing the torque of the electric motor to indicate a weight of grass in a grass catcher.

13. The mower cutting unit lift system of claim 8, wherein the flexible link is connected to a crank on a shaft that is turned by the electric motor, wherein the electric motor turns the shaft and the crank over center into contact with a stop such that the weight of the reel cutting unit holds the reel cutting unit in the transport position without power to the electric motor.

14. The mower cutting unit lift system of claim 8, further comprising a spool connected to an output shaft of the electric motor, the spool configured to wind the flexible link thereabout.

15. The mower cutting unit lift system of claim 8, wherein the flexible link defines a vertex at a contact point with a roller, and an angle of the flexible link about the vertex changes during extension and retraction of the flexible link.

16. The mower cutting unit lift system of claim 8, wherein the electric motor is a rotary motor.

17. The mower cutting unit lift system of claim 8, wherein the cutting unit includes a reel.

18. The mower cutting unit lift system of claim 8, wherein the cutting unit pivots between the transport position and the mowing position.

19. A mower cutting unit lift system, comprising:
   a plurality of rotary motors that are positioned remotely from a plurality of lift arms and a plurality of cutting units, the plurality of rotary motors rotating a plurality of shafts connected to cranks; and
   a plurality of flexible links connecting the plurality of rotary motors to the plurality of lift arms to lift and lower the plurality of cutting units when the plurality of rotary motors are activated;
   wherein the plurality of flexible links bend to lift and lower the plurality of cutting units.

20. The mower cutting unit lift system of claim 19 further comprising a battery powering the plurality of rotary motors.

21. The mower cutting unit lift system of claim 19 wherein the plurality of flexible links each include a rubber component.

22. A mower cutting unit lift system, comprising:
   a rotary motor connected to a power supply and turning an output shaft connected to a crank;
   a flexible link between the crank and a lift arm that lifts a cutting unit to a transport position if the rotary motor turns the output shaft and the crank in a first direction, and lowers the cutting unit to a mowing position if the rotary motor turns the output shaft and the crank in a second direction; and
   measuring the torque of the rotary motor and providing the torque to a controller.

23. A mower cutting unit lift system, comprising:
a rotary motor connected to a power supply and turning an output shaft; and
a flexible link between the rotary motor and a lift arm that lifts a cutting unit including a reel to a transport position if the rotary motor turns the output shaft in a first direction, and lowers the cutting unit to a mowing position if the rotary motor turns the output shaft in a second direction;
wherein the flexible link bends as the cutting unit moves between the transport position and the mowing position.

\* \* \* \* \*